United States Patent [19]

Meier

[11] Patent Number: 4,486,906
[45] Date of Patent: Dec. 11, 1984

[54] WATER-SAVING FLUSH VALVE

[75] Inventor: Robert Meier, Rapperswil, Switzerland

[73] Assignee: Geberit Manufacturing, Inc., Michigan City, Ind.

[21] Appl. No.: 502,692

[22] Filed: Jun. 9, 1983

[51] Int. Cl.³ .............................................. E03D 1/34
[52] U.S. Cl. ........................................... 4/378; 4/391; 4/415
[58] Field of Search ............... 4/390, 391, 324, 325, 4/327, 355, 356, 358, 378, 415

[56] References Cited

U.S. PATENT DOCUMENTS 2,077,832  4/1937  Gebert
3,969,774  7/1976  Karlsson ............................ 4/391 X
4,357,720  11/1982 Stähli ................................. 4/391 X

FOREIGN PATENT DOCUMENTS 181986  1/1936  Switzerland .
206591  8/1939  Switzerland .
323271  7/1957  Switzerland .
346836  7/1960  Switzerland .
443172  1/1968  Switzerland .
2065737 7/1981  United Kingdom ..................... 4/391

Primary Examiner—Charles E. Phillips
Attorney, Agent, or Firm—Marmaduke A. Hobbs

[57] ABSTRACT

A flush valve assembly for use in the water storage tank of a toilet, the closing speed of which can be controlled and adjusted to seal the storage tank as soon as the trap in the toilet bowl has been refilled, thereby preventing water loss from an overfilled trap. A valve cup having a float is rotatably mounted within a housing and has an elongated horizontal slot or the like near the lower edge. The valve cup contains water when the storage tank is full, and upon initiation of a flush cycle, the float engages an abutment which is secured to the valve shaft and retards the rate of descent of the valve shaft by floating downwardly on the water in the valve cup as this water drains from the horizontal slot. The valve cup can be rotated to variably restrict the slot, thereby increasing or decreasing the rate of descent of the valve shaft to seal the tank as soon as the trap has been refilled.

16 Claims, 4 Drawing Figures

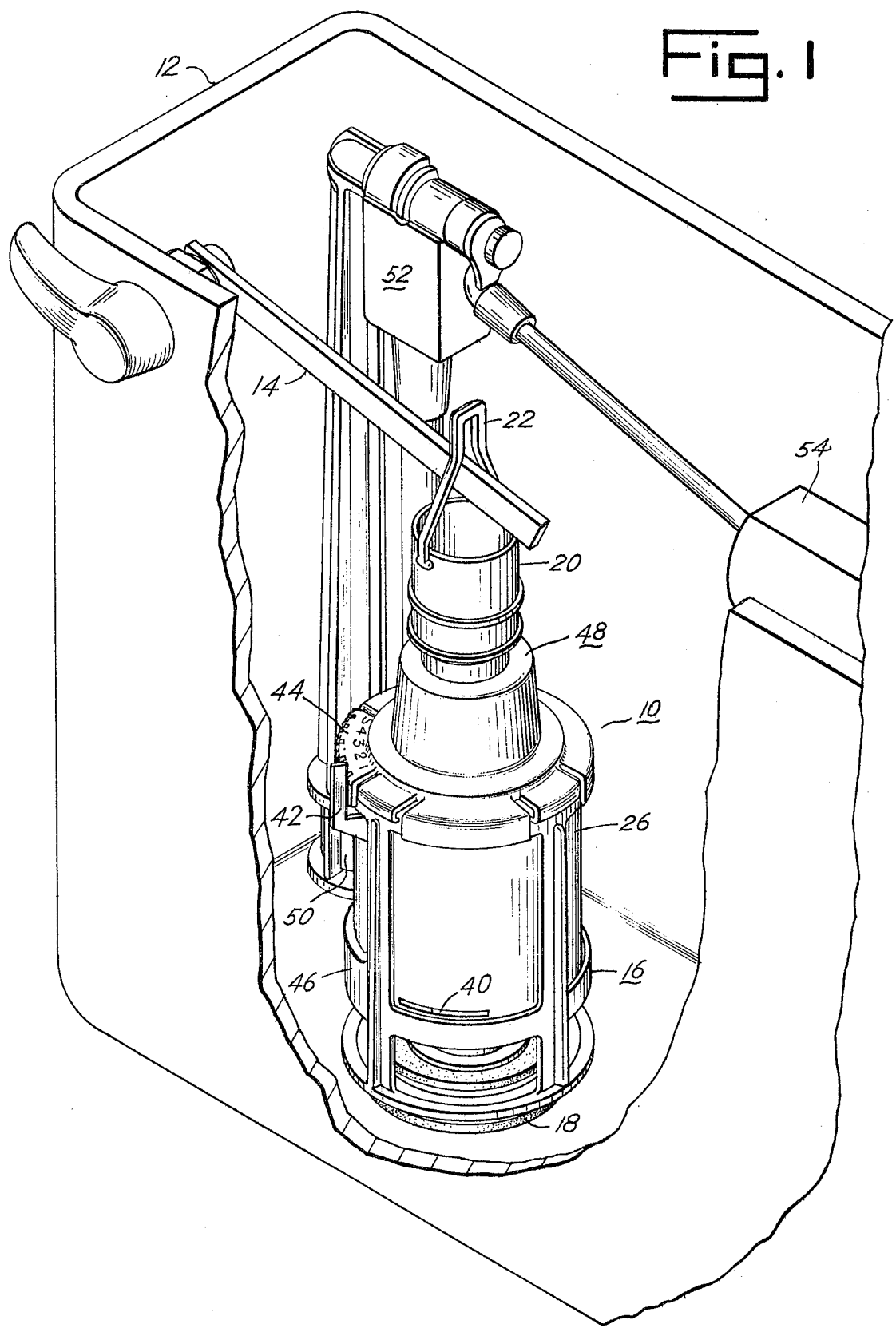

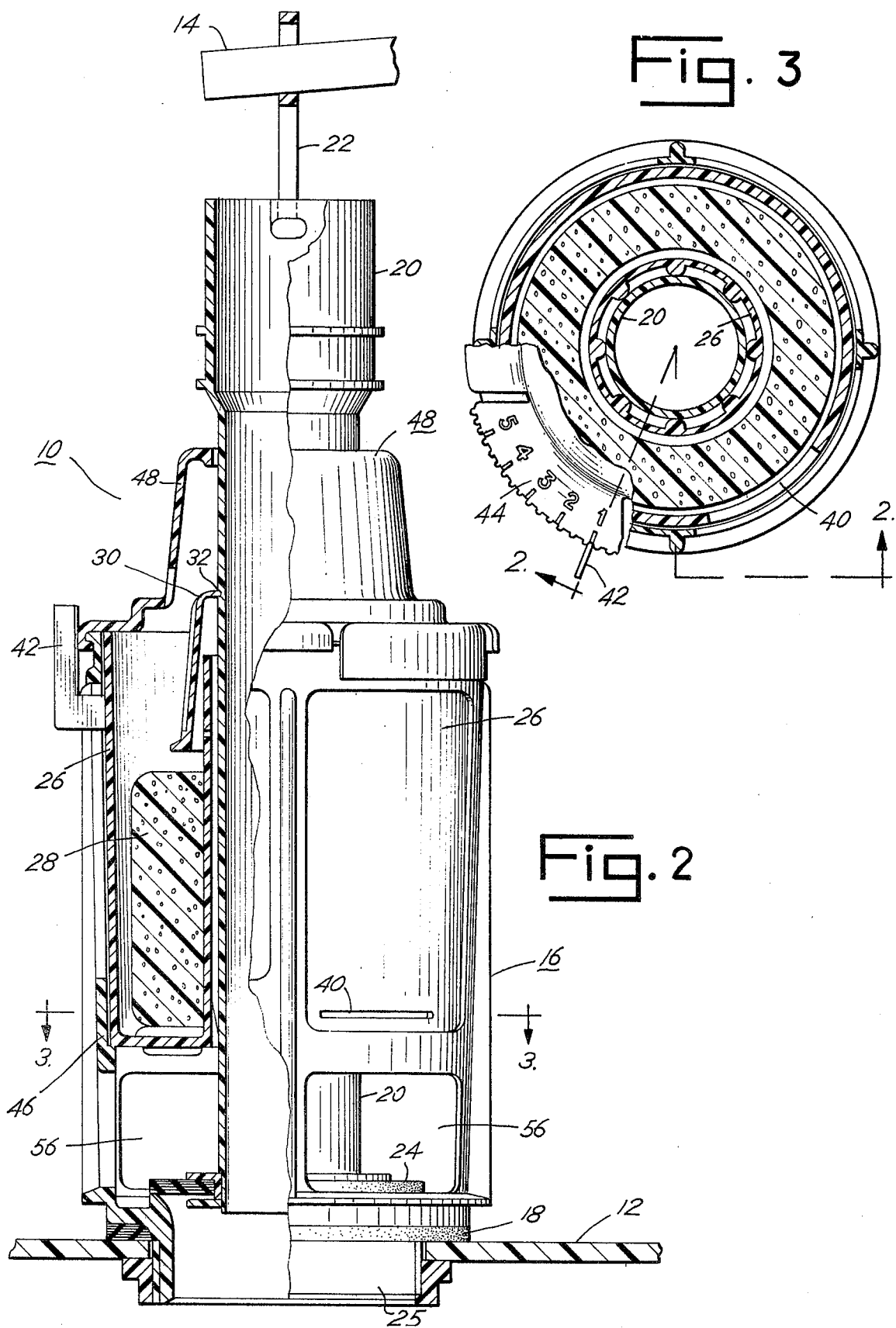

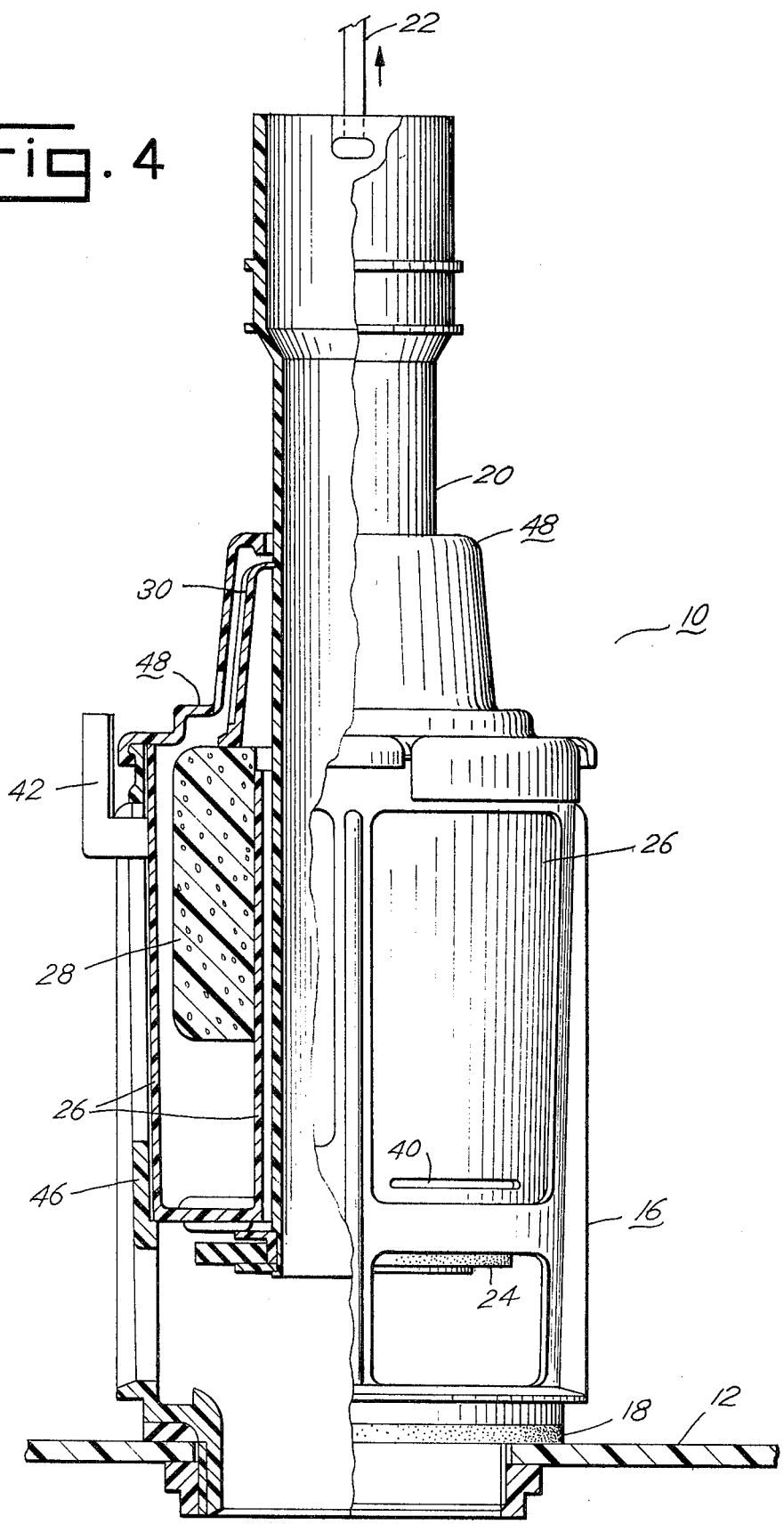

WATER-SAVING FLUSH VALVE

BACKGROUND OF THE INVENTION

The flush cycle of most conventional toilets is initiated by moving a lever or chain which pulls a plug or inflated stopper out of its seat in the bottom of a storage tank, releasing the stored water into the bowl and leaving the stopper to float downwardly on the descending water toward its seat. When the water in the bowl reaches a certain threshold level, a siphonic action is created which siphons the water out of the bowl and into a drain pipe which carries the flushed contents to the sewer system. The normal capacity of storage tanks used for this purpose is sufficient to initiate the siphonic action and to refill the trap in the bowl once the flush cycle has begun. The siphonic action continues until the bowl has been emptied and air breaks the siphon, whereupon the trap in the bowl is refilled by the remaining water draining from the tank or, in some models, by the draining water and a supplemental refill passage. As the remaining water drains from the tank into the trap, the stopper or plug floats down to seal the tank and fresh water fills the tank for the succeeding flush cycle.

The timing of this cycle is important both for efficient operation of the toilet and for economy considerations. Proper flushing action and trap refill are needed to remove waste materials and to seal the drain against noxious sewer gases. After the waste materials have been flushed, it is important to seal the tank to prevent water loss as soon as the siphonic action has been interrupted by air and the trap has been refilled. Improper timing of this cycle may result in as much as a gallon or more of water being needlessly wasted, as water added to a full trap, while in sufficient to initiate the siphonic action, will overflow from the overfilled trap to the drain pipe. This waste occurs with every improperly timed flush cycle, resulting in considerable expense both in terms of use of unneeded water and loss of valuable resources. In addition, the wasted water either shortens the period of time a septic tank may be used before it must be emptied, or increases the load placed on the local sewage treatment plant, leading to additional expenses, both individually and collectively.

Since most conventional toilets use approximately five gallons of water per flush, many methods and devices have been developed to reduce this water consumption. These include such simple measures as placing a brick or a weighted plastic bottle in the tank to displace a volume of water; bending the float rod downward to reduce the amount of water required to fill the tank to the operating level; or placing a baffle in the tank against a side wall or around the drain hole to keep some of the water in the tank. More complex measures include using specially designed shallow trap model toilets, or models which use air pressure or mineral oil as a flushing agent. These alternative methods and devices are generally either prohibitively expensive or save water at the expense of flushing performance, disadvantages which are normally unacceptable.

SUMMARY OF THE INVENTION

It is, therefore, one of the principal objects of the present invention to provide a flush valve for a toilet which closes and seals the water outlet of the storage tank as soon as the trap in the bowl has been refilled, thereby sealing the bowl against the intrusion of noxious sewer gases and eliminating waste of water from an overfilled trap.

Another object of the present invention is to provide a flush valve which is inexpensive to produce and to install in existing toilets and which has no parts subject to corrosion by water.

A further object of this invention is to provide a flush valve which does not adversely affect flushing performance by delivering an amount of water sufficient to effect flushing and trap refill independent of water pressure changes, and which is adjustable to control the timing of the emptying and refilling cycle of the tank, thereby providing the desired flush and refill performance for different sizes and types of toilets, for example the shallow trap models.

These and other objects are attained by the present invention, which relates to a flush valve for use in the water storage tank of a toilet, having a valve shaft with a sealing means or disc at its lower end, the shaft being vertically slidable for opening and closing the storage tank. A valve cup surrounds the valve shaft, forming a separate water storage means inside the tank, and has a buoyant means or float cylinder disposed therein. The cup has a port means formed in its side near the lower edge for releasing the water stored therein and controlling the cycle, and an adjustment means for selectively increasing or decreasing the rate at which the water is released from the cup for adjusting the cycle. Upon initiation of a flush cycle, the valve shaft is moved upwardly, thereby unsealing the tank and releasing the stored water into the bowl. The pressure release and the removal of water, which had previously been covering and holding down the sealing disc, allows the buoyant cylinder to float on the water in the cup and to engage an abutment means secured to the valve shaft at a level above the float cylinder. The cylinder floats downwardly on the descending water in the valve cup, thereby lowering the abutment means and its attached valve shaft towards the seat in the bottom of the tank. In one embodiment, the valve cup is rotated within the valve housing to effectively increase or decrease the size of the port means to obtain optimum performance and maximum water economy in the toilet flushing operation.

BRIEF DESCRIPTION OF THE DRAWINGS

FIG. 1 is a perspective view of the flush valve embodying the present invention, shown here installed in a water storage tank of a toilet, with a portion of the tank wall broken away revealing the flush valve installation;

FIG. 2 is a side elevational view of the flush valve shown partially in cross section, illustrating the positioning of the interior components before being submerged in water in the toilet tank the section being taken on line 2—2 of FIG. 3;

FIG. 3 is a cross sectional view of the flush valve, with a portion of the adjusting lever and a dial indicator shown in plan view, the section being taken on line 3—3 of FIG. 2; and FIG. 4 is a side elevational and cross-sectional view of the flush valve similar to that of FIG. 2, illustrating the positioning of the interior components subsequent to the initiation of the flush cycle, the section being taken on line 2—2 of FIG. 3.

DETAILED DESCRIPTION OF THE PREFERRED EMBODIMENT

Referring more specifically to the drawings, and to FIG. 1 in particular, numeral 10 designates generally the flush valve assembly embodying the present invention, shown here installed in a water storage tank 12 of a toilet. The flush valve may be installed in any of a plurality of different types or makes of storage tanks, regardless of the type and capacity of the tank, trap, or bowl, and can be used with most of the existing fixtures common to such storage tanks, such as the flush lever 14 shown here.

Supporting the flush valve assembly in the tank is a housing 16 which is threadedly or otherwise secured in the drain opening in the bottom of the storage tank, sealed therein with a gasket 18. Extending vertically through the center of the housing is a cylindrical valve shaft 20 with a bracket 22 connected at its upper end to flush lever 14. An elastomeric sealing means or disc 24 is connected to the lower end of the shaft for sealing the water outlet 25 of the tank. The valve shaft is hollow and in communication with the trap in the bowl, whereby the shaft serves as an overflow passage should the tank become overfilled. The hollow design of the valve shaft also permits the shaft to sink into the water remaining in the tank after the flush operation has been completed, rather than floating downwardly on the surface of the descending water, thereby enabling the present invention to seal the tank before it is completely emptied. In contrast, a conventional ball stopper must float down to its seat and can not seal the tank until it is almost completely emptied.

A cylindrical valve cup 26 having an open upper end is disposed in the housing and has a central opening for slidably receiving the valve shaft. Disposed within the valve cup is a buoyant means or float such as a solidified, expanded plastic foam cylinder 28. When the storage tank is full, the valve cup is also full and foam cylinder 28 is in contact with abutment means 30, but the water on top of the disc 24 helps to prevent the foam cylinder from raising the valve shaft before the initiation of a flush cycle. When a flush cycle is begun by moving the flush lever, the valve shaft is raised along with an inverted cone-shaped abutment means 30 which has been secured to the shaft by seating in a groove in the valve shaft at 32. When the disc is dislodged from its seat and the water which had been covering the disc and holding the valve shaft down begins to drain, the foam cylinder rises, floating in the water in the cup. The floating cylinder, in contact with abutment 30, thereby keeps abutment means 30, valve shaft 20, and disc 24 in a raised position while the water drains out of the tank, as shown in FIG. 4.

The water inside the cup is drained through a port means, shown as an elongated horizontal slot 40 in the side of the cup near its base. As the water drains out of the cup, the foam cylinder floats downwardly on the descending water, thereby lowering the abutment 30 and the attached valve shaft and disc toward the seat in the bottom of the tank. The speed of descent of the valve shaft can be controlled and adjusted to an optimum performance level to close the water outlet 25 and seal the tank as soon as the trap in the bowl has been refilled.

The length of time during which the sealing disc 24 remains off its seat is regulated by a mechanism involving a structural relationship between slot 40 and the inner adjacent surface of the housing. The valve cup can be rotated within the housing using an adjustment lever 42, which has been secured to the cup near its upper edge. In FIG. 1, the slot 40 is shown fully exposed with the adjustment lever set at the numeral 1 on an adjustment dial 44. As the adjustment lever is moved toward a higher number on the dial, the cup rotates, moving the slot behind an adjustment means or cover plate 46 in the housing, thereby reducing the effective size of the slot. The reduced slot size restricts the flow of water from the cup and reduces the rate of descent of the float cylinder and the valve shaft to allow more water to flow out of the tank before it is sealed. This increases the amount of water used in each flushing operation and accommodates the filling of larger traps. For filling a shallow trap model toilet with reduced volume capacity, or a model with a supplemental refill valve, less water from the storage tank is required and the adjustment lever is set at a low number. This setting increases the size of slot 40 and hence the rate at which cup 26 is emptied, thereby increasing the rate of descent of the valve shaft and reducing the time required for the disc to again close outlet 25.

Covering the valve cup and having the adjustment dial 44 printed or engraved thereon, is a cap 48, the rim of which slips over the top rim of the housing, securing the internal components therein. After the valve shaft descends and the disc 24 seals the tank, the tank is refilled with water through an inlet pipe 50 controlled by valve 52 and float 54. The water flows over the disc through the large water entry passages 56 near the base of the housing, helping to hold the disc and the valve shaft in place, and into the valve cup, filling the cup for use in the succeeding flush cycle. The weight of the water on the disc keeps the valve shaft seated against the buoyancy of the foam cylinder and keeps the tank sealed between flushes. When the shaft is raised for a flush cycle and the weight of the water is removed from the top of the disc, the foam cylinder provides sufficient buoyancy to hold the shaft and sealing disc in their raised position until the water drains from the cup through slot 40, thereby lowering the foam cylinder, the valve shaft, and the attached disc.

In the use and operation of the flush valve embodying the present invention, the valve 10 is installed in the water storage tank 12 of a toilet, using the existing drain outlet and secured therein by a nut or other means. The storage tank and the trap in the bowl are then allowed to fill with water and the water level in the bowl is noted and marked when the trap is filled to a level sufficient to seal the bowl against the intrusion of sewer gases and provide enough water in the bowl to effect satisfactory flushing performance. At this point, the tank should be sealed to prevent wasting water. A flush cycle is then initiated and the adjustment lever 42 is used to move the valve cup 26 and expose more or less of the elongated slot 40, thereby adjusting the rate of descent of the valve shaft to seal the tank as soon as the optimum trap refill level is attained. This adjustment feature enables the flush valve to compensate for differences in water pressure and differences in trap capacity, sealing the tank when the trap is full and preventing water loss from an over-filled trap. From the foregoing description, it can be seen that the present invention is suited for use with many different types and models of toilets. The flush valve is adjustable to dispense only the amount of water necessary to complete the flush cycle and refill the trap, thereby attaining maximum water economy.

While one embodiment of a water-saving flush valve has been shown and described in detail herein, various changes and modifications may be made without departing from the scope of the present invention.

I claim:

1. A flush valve assembly for use in the water storage tank of a toilet, said tank having a water outlet in the bottom thereof, said valve comprising a valve shaft having a sealing means at the lower end thereof for closing the water outlet of the tank, said valve shaft being vertically slidable for sealing and unsealing the tank outlet, a valve cup having a buoyant means disposed therein, said valve cup having a port means near the lower end thereof for releasing water stored in said cup, an abutment means secured to said valve shaft and disposed above said buoyant means for cooperating with said buoyant means to lift said shaft and sealing means and to control the rate of descent of said shaft after a flush cycle has been initiated, and an adjustment means for varying the size of said port means for changing the rate of the release of the water from said cup.

2. A flush valve assembly as defined in claim 1 in which said port means includes an elongated, horizontal slot formed near the lower edge of the side of said valve cup.

3. A flush valve assembly as defined in claim 2 in which said valve cup is rotatable and has an adjustment lever for rotating said cup, and said adjustment means includes a cover plate behind which said horizontal slot is rotated for varying the effective size of said slot.

4. A flush valve assembly as defined in claim 3 in which said buoyant means includes a solidified, expanded plastic foam cylinder having a hollow center for surrounding said valve shaft.

5. A flush valve assembly as defined in claim 4 in which said abutment means includes an inverted cone-shaped member having a hollow center for surrounding said valve shaft, said member having an upper end secured in a groove in said valve shaft and a lower end projecting into said valve cup for engaging said buoyant means.

6. A flush valve assembly as defined in claim 1 in which a housing is provided for supporting said valve shaft and said valve cup within the storage tank, said housing being cylindrical and having an open lower end for connection to the drain outlet in the bottom of the storage tank.

7. A flush valve assembly as defined in claim 6 in which said valve shaft is cylindrical and has open upper and lower ends, said upper end serving as an overflow protection means and said lower end facilitating the sinking of said shaft into the water in the storage tank.

8. A flush valve assembly as defined in claim 7 in which said sealing means includes an elastomeric disc for seating over the outlet of the storage tank.

9. In a flush valve assembly for use in a toilet water tank with a water outlet in the bottom, the assembly having a housing for supporting said valve assembly in the storage tank, a valve shaft vertically slidable within said housing and having a sealing means at its lower end for seating over the outlet, a buoyant means disposed within said housing and an abutment means secured to said valve shaft at a position above said buoyant means for engaging said buoyant means, wherein the improvement comprises a rotatable valve cup disposed within said housing and forming therein a water storage means, said cup having a port means near its lower end for releasing the water stored within said cup, and an adjustment means for variably restricting said port means upon rotation of said valve cup thereby controlling the rate of release of water from said cup and hence the length of time said sealing means is removed from its seat during a flushing cycle.

10. A flush valve assembly as defined in claim 9 in which said port means includes an elongated, horizontal slot formed in the side of said valve cup.

11. A flush valve assembly as defined in claim 10 in which said adjustment means includes a cover plate secured to said housing behind which said horizontal slot is selectively rotated.

12. A flush valve assembly as defined in claim 11 in which said buoyant means is disposed within said valve cup and engages said abutment means after a flush cycle has been initiated to cause the rate of descent of said valve shaft to correspond with the rate at which the stored water drains from said valve cup.

13. A flush valve assembly as defined in claim 9 in which said buoyant means includes a solidified, expanded plastic foam cylinder and said abutment means includes an inverted cone-shaped member having a hollow center for surrounding said valve shaft, said member having an upper end secured within a groove in the wall of said valve shaft and a lower end projecting into said valve cup for engagement by said foam cylinder.

14. A flush valve assembly for use in a toilet tank with a water outlet in the bottom, comprising a housing for supporting said valve assembly in the storage tank, a valve shaft vertically slidable within said housing and having a sealing means at the lower end thereof for seating over and closing the tank outlet, a valve cup disposed around said valve shaft with a buoyant means disposed therein and having a port means therein near its lower end for releasing water stored in said cup, an abutment means secured to said valve shaft for engaging said buoyant means after the initiation of a flush cycle and controlling the rate of descent of said valve shaft, and an adjustment means for variably restricting the release of water through said port means.

15. A flush valve assembly as defined in claim 14 in which said adjustment means includes an adjustment lever for rotating said valve cup and a cover plate disposed on said housing in close proximity to said port means for variably restricting said port means upon relative angular movement between said port means and said cover plate.

16. A flush valve assembly as defined in claim 15 in which said port means includes an elongated, horizontal slot, and said valve cup rotates on a vertical axis around said valve shaft.

* * * * *